(12) United States Patent
Chaussat et al.

(10) Patent No.: US 9,371,862 B2
(45) Date of Patent: Jun. 21, 2016

(54) BEARING ASSEMBLY AND ROTARY ELECTRIC MACHINE COMPRISING SUCH A BEARING

(75) Inventors: Sylvain Chaussat, Tours (FR); Pierrick Maze, Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 58 days.

(21) Appl. No.: 14/369,970

(22) PCT Filed: Dec. 28, 2011

(86) PCT No.: PCT/IB2011/003322
§ 371 (c)(1),
(2), (4) Date: Oct. 1, 2014

(87) PCT Pub. No.: WO2013/098585
PCT Pub. Date: Jul. 4, 2013

(65) Prior Publication Data
US 2015/0043847 A1 Feb. 12, 2015

(51) Int. Cl.
| | |
|---|---|
| *F16C 17/02* | (2006.01) |
| *F16C 41/00* | (2006.01) |
| *F16C 43/02* | (2006.01) |
| *F16C 43/04* | (2006.01) |
| *G01P 3/44* | (2006.01) |
| *F16C 35/04* | (2006.01) |
| *F16C 17/00* | (2006.01) |
| *F16C 19/00* | (2006.01) |
| *G01P 1/02* | (2006.01) |
| *F16C 19/06* | (2006.01) |

(52) U.S. Cl.
CPC ............... *F16C 41/007* (2013.01); *F16C 17/00* (2013.01); *F16C 19/00* (2013.01); *F16C 35/045* (2013.01); *G01P 1/02* (2013.01); *G01P 3/443* (2013.01); *F16C 19/06* (2013.01); *F16C 2380/26* (2013.01)

(58) Field of Classification Search
CPC ........................................................ F16C 41/007
USPC ........................ 384/448, 129, 537, 584, 585
See application file for complete search history.

(56) References Cited

U.S. PATENT DOCUMENTS

| | | | | |
|---|---|---|---|---|
| 6,094,046 | A | * 7/2000 | Message | ............. F16C 33/7886 324/173 |
| 2003/0031391 | A1 | 2/2003 | Vignatto et al. | |

FOREIGN PATENT DOCUMENTS

| | | |
|---|---|---|
| DE | 102005042655 A1 | 3/2007 |
| EP | 1933155 A1 | 6/2008 |

(Continued)

*Primary Examiner* — Phillip A Johnson
(74) *Attorney, Agent, or Firm* — Bryan Peckjian; SKF USA Inc. Patent Dept.

(57) ABSTRACT

A bearing assembly for rotatively holding a shaft with respect to a support member and comprises: a bearing, with a rotatable ring and a fixed outer ring to be immobilized within a housing of said support member. An encoder washer is fast in rotation with the rotating ring. At least one sensor is adapted to detect at least one rotation parameter of the encoder washer and a sensor body holds this sensor. An annular flange is used for mounting said sensor body with respect to the fixed outer ring. The annular flange has a first skirt and a second skirt which define, between them and a bottom wall of the flange, an annular recess for accommodating at least a part of the sensor body. In mounted configuration of the bearing assembly, the first and second skirts extend respectively towards the rotatable and fixed rings.

20 Claims, 3 Drawing Sheets

(56) References Cited

FOREIGN PATENT DOCUMENTS

| FR | 2698421 | A1 | 5/1994 |
| FR | 2946108 | A1 | 12/2010 |
| WO | 2006115162 | A1 | 11/2006 |
| WO | 2010116206 | A1 | 10/2010 |

* cited by examiner

BEARING ASSEMBLY AND ROTARY ELECTRIC MACHINE COMPRISING SUCH A BEARING

CROSS-REFERENCE TO RELATED APPLICATIONS

This is a National Stage application claiming the benefit of International Application Number PCT/IB2011/003322 filed on 28 Dec. 2011, which is incorporated herein by reference in its entirety. It is noted that 28 Jun. 2014 falls on a Saturday, and therefore, the instant application is considered co-pending through the next business day, 30 Jun. 2014.

FIELD OF THE INVENTION

This invention relates to a bearing assembly for rotatively holding a shaft with respect to a support member. Such a bearing assembly includes, amongst others, at least one sensor adapted to detect a rotation parameter of an encoder washer.

This invention also relates to an electric machine, such as an electric motor, including, amongst others, a bearing assembly as mentioned here-above.

BACKGROUND OF THE INVENTION

Generally speaking, a bearing comprises an inner ring and an outer ring adapted to rotate around a rotation axis, one with respect to the other. In a plain bearing, the two rings are in sliding contact. In a rolling bearing, several rolling bodies are installed between the two rings. These rolling bodies can be balls, rollers or needles. Thus, a rolling bearing can be, for instance, a ball bearing, a roller bearing or a needle bearing.

In the field of bearings, it is known to use a tachometer in order to determine the rotation speed of a shaft supported by a bearing with respect to a supporting member, such as the casing of an electric machine. As explained in EP-A-1 933 155, one can use an encoder washer with magnetic poles fast in rotation with a rotating ring of a bearing, and one or several sensors distributed around the encoder washer or located in front of it. An air gap is provided between the encoder washer and the or each sensor. Detection of a rotation parameter of the encoder washer occurs through this air gap, thanks to the variation of a magnetic field generated by the encoder washer.

It is known from FR-A-2 698 421 to use an annular part forming a sensor support member, for a sensor designed to cooperate with a permanent magnet.

A key point for an efficient detection of a rotation parameter is that the magnetic field generated by the encoder washer in the vicinity of the sensor should not be disturbed by a surrounding magnetic field. This cannot be guaranteed with the devices of the prior art, insofar as the air gap between the encoder washer and the or each sensor is not efficiently protected against magnetic perturbations. This is all the more important that some applications of a rotation detection occur in a strongly perturbated magnetic environment, such as in the vicinity of the rotor and stator of an electric machine where intense magnetic fields are generated.

SUMMARY OF THE INVENTION

This invention aims at solving these problems with a new bearing assembly which is efficient to detect a rotation parameter of an encoder washer fast with a rotating ring, even if it is installed in a magnetically disturbed environment.

To this end, the invention concerns a bearing assembly for rotatively holding a shaft with respect to a support member, this bearing assembly comprising a bearing with a rotatable ring and a fixed ring to be immobilized within a housing of the support member, an encoder washer fast in rotation with the rotatable ring, at least one sensor adapted to detect at least one rotation parameter of the encoder washer, a sensor body for holding this sensor, an annular flange for mounting the sensor body with respect to the fixed ring. According to the invention, the annular flange has a first skirt and a second skirt which define, between them and with a bottom wall of the flange, an annular recess for accommodating at least a part of the sensor body and wherein, in the mounted configuration of the bearing assembly, the first and second skirts extend respectively towards the rotatable and fixed rings.

Thanks to the invention, the first and second skirts of the annular flange participate to forming a closed shield around an air gap defined between the encoder washer and the or each sensor. The geometry of these two skirts enables the flange to constitute with the bearing a screened room or Faraday cage which protects the encoder washer and the sensor(s) from electromagnetic perturbations.

In the present description, the words "axial", "radial", "axially" and "radially" relate to the axis of rotation of the rotatable ring with respect to the fixed ring of the bearing or the axis of rotation of the encoder washer. A direction is "axial" when it is parallel to such an axis and "radial" when it is perpendicular to and secant with such an axis. A surface is "axial" when it is perpendicular to an axial direction and "radial" when it is perpendicular to a radial direction and centered on the axis of rotation. A "radially inner" part is closer to this axis, along a radial direction, then a "radially outer" part. A rotation parameter is representative of the rotation movement of the encoder washer. Such a parameter can be an angle, a speed, a displacement, an acceleration or a vibration.

According to further aspects of the invention which are advantageous but not compulsory, this bearing assembly can incorporate one or several of the following features, taken in any admissible configuration:

The bearing assembly includes mounting means for immobilizing the flange on the support member. These mounting means advantageously include some screws for mounting the flange on the support member.

In mounted configuration, the first skirt forms a part of a first preferred path for magnetic flux between the bottom of the flange and the rotatable ring. This first preferred path can include a portion of the shaft. This first preferred path can also include a portion of an armature of the encoder washer.

In mounted configuration, the second skirt forms a part of a second preferred path for a magnetic flux between the fixed ring and the bottom wall of the flange. When the bearing assembly includes mechanical means to hold the fixed ring within the housing of the support member, the second preferred path can include a portion of these mechanical means. Such mechanical means can include a snap ring. Alternatively, the second preferred path includes only the second skirt.

The bearing is a rolling bearing with rolling bodies installed in a rolling chamber between the rotatable and fixed rings and, in mounted configuration, the rolling bodies form a part of a third preferred path for magnetic flux between the rotatable and fixed rings.

Alternatively, the bearing is a plain bearing and a third preferred path for a magnetic flux is formed at the interface between the inner and outer rings.

The first, second and third preferred paths form together a closed path.

The second skirt has at least one opening for direct contact between the sensor body and a wall of the housing.

The invention also concerns a rotary electric machine, such as an electric motor, having a casing supporting a rotating shaft. According to the invention, this rotary electric machine includes at least one bearing assembly as mentioned hereabove.

BRIEF DESCRIPTION OF THE DRAWINGS

The invention will be well understood on the basis of the following description which is given in correspondence with the annexed figures and as an illustrative example, without restricting the object of the invention. In the annexed figures.

DESCRIPTION OF SOME EMBODIMENTS

The rolling bearing assembly A represented on the figures is used to rotatively hold a rotating shaft 2 with respect to a support member 4 forming part of the casing 6 of a non further represented electric motor M. Rotating shaft 2 has a corrugated central opening 2A which is centered on an axis X2 and adapted to accommodate a non-represented shaft extending within casing 6 and supporting a rotor of motor M.

Figure 1:
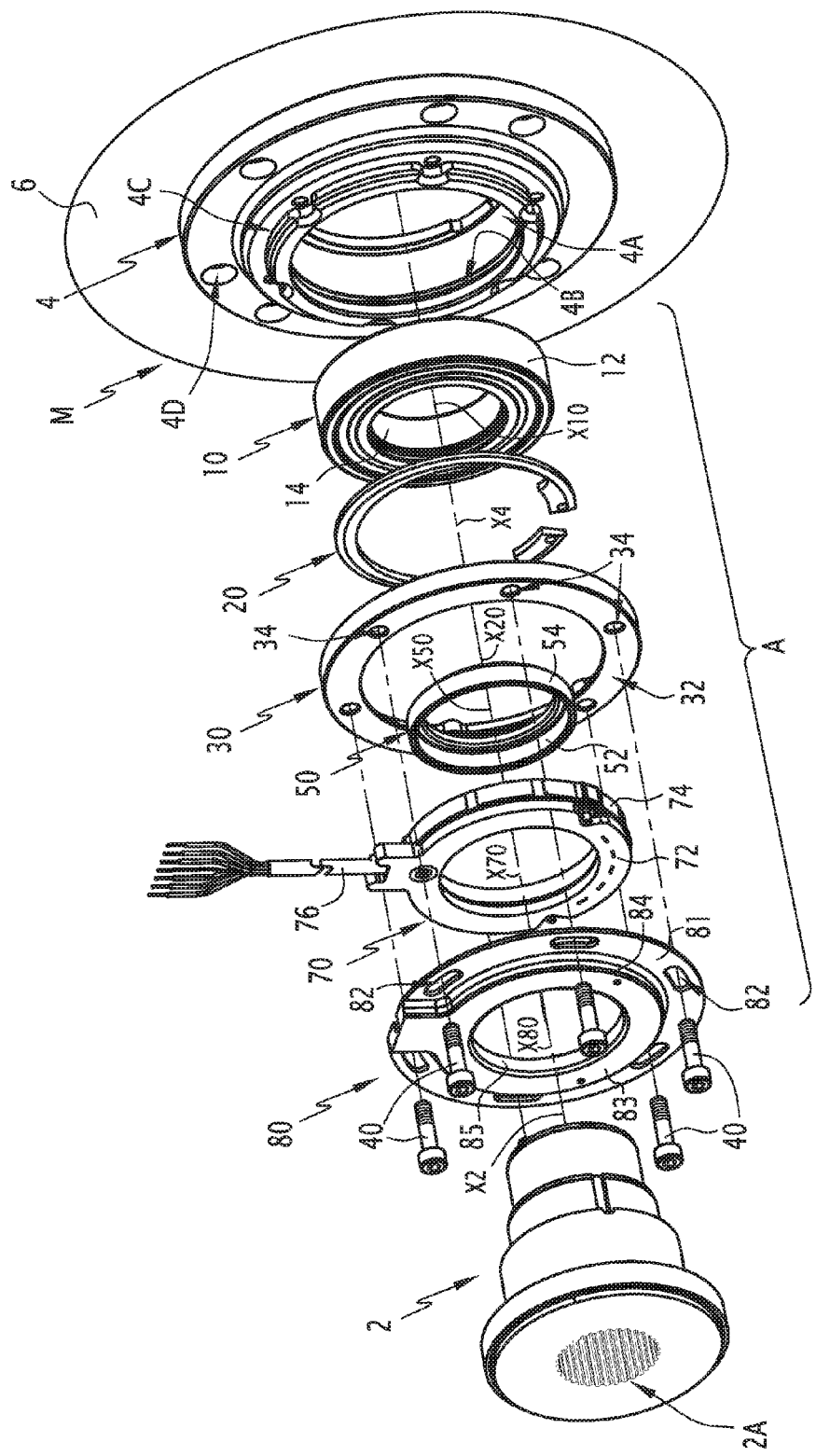
FIG. 1 is a perspective exploded view of a support member, a shaft and a bearing assembly according to the invention.

FIG. 1 shows support member 4 mounted on casing 6. Alternatively, these two parts can be integral with each other.

Bearing assembly A includes a ball bearing 10 with a fixed outer ring 12 and a rotatable inner ring 14. Some balls 16 are located in a rotation chamber 18 defined between respective raceways of rings 12 and 14, as shown on FIGS. 3 and 4. X10 denotes the rotation axis of inner ring 4 with respect to outer ring 12 in bearing 10. In mounted configuration of bearing assembly A, axis X10 is superimposed with a central axis XA of bearing assembly A.

Support member 4 is provided with a circular opening 4A centered on an axis X4 which is superimposed with axis XA in mounted configuration of bearing assembly A with respect to support member 4.

Bearing assembly A also includes a snap ring or circlip 20 which is accommodated within an inner circumferential groove 4B of support member 4, next to housing 4A. Thus, when in position within groove 4B, snap ring 20 holds bearing 10 within housing 4A.

Snap ring 20 is optional and can be omitted in an alternative embodiment, e.g. when outer ring 12 is press-fitted within housing 4A.

Bearing assembly A also includes a spacer ring 30 adapted to be mounted on an outer collar 4C of support member 4 via six screws 40. Spacer ring 30 has a flat side surface 32 which is oriented opposite to support member 4 when spacer ring 30 is mounted onto support member 4. Spacer ring 30 is optional insofar as it can be omitted if support member 4 has a flat surface analogous to surface 32.

Bearing assembly A also includes an encoder washer 50 formed of a bipolar permanent magnet ring 52 and a ferromagnetic armature 54. Encoder washer 50 is fixedly mounted on inner ring 14. This is obtained by engaging an annular skirt 542 of armature 54 within a radial inner groove 142 of inner ring 14.

Bearing assembly A also includes several sensors adapted to detect a rotation parameter of encoder washer 50. One of these sensors is visible on FIGS. 3 and 4 with reference 60. Actually, several sensors can be distributed around axis XA. These sensors 60 are installed within a sensor body 70 formed of a printed circuit board 72 and a synthetic ring 74 provided with respective housings for the sensors 60. An electric cable 76 is connected to PCB 72 and enables to feed it with electric power and convey output signals of sensors 60.

Bearing assembly A also includes an annular flange 80 which is designed to be mounted onto spacer ring 30 and support member 4 thanks to the set of screws 40. To this end, flange 80 includes a radially external flat annular band 81 provided with several oblong holes 82 adapted to be aligned with respective holes 34 of spacer ring 30 and threaded holes 4D of support member 4. Screws 40 are used to immobilize flange 80 on spacer ring 30 and support member 4. The fact that openings 82 are oblong allows to adjust the angular orientation of flange 80, around axis XA, with respect to items 4 and 30.

Items 2, 4, 12, 14, 16, 20 and 80 are made of ferromagnetic materials, such as steel.

X30, X50, X70 and X80 respectively denote the central axis of spacer ring 30, encoder washer 50, sensor body 70 and flange 80. These axes and axis X2 are superimposed with axis XA in the mounted configuration of bearing assembly A.

Figure 2:
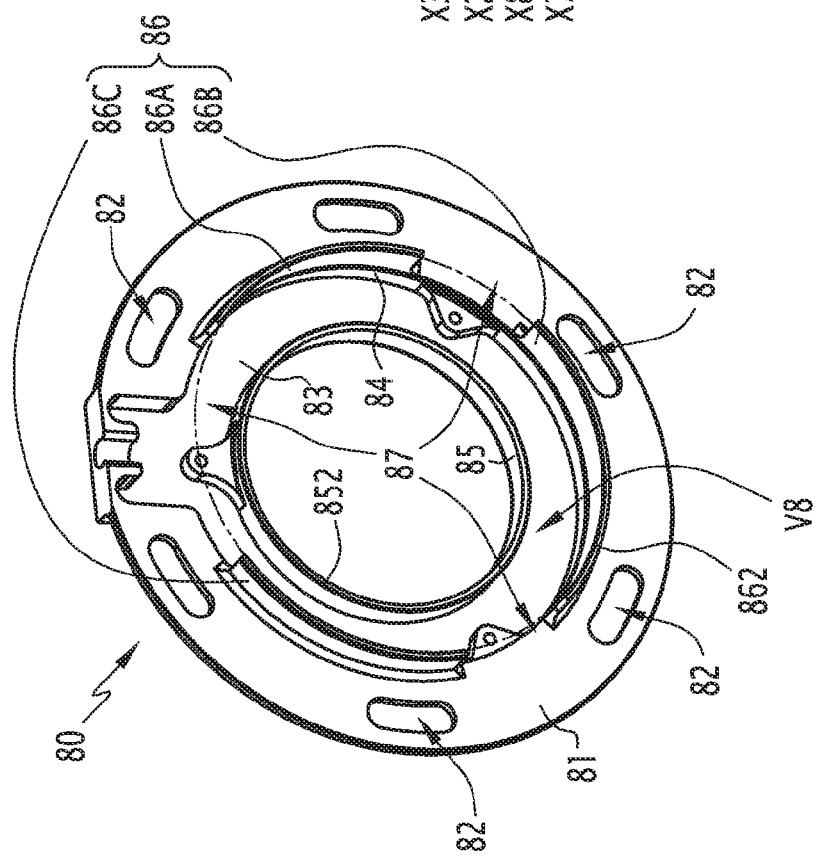
FIG. 2 is a perspective view, in another direction, of an annular flange belonging to the bearing assembly of FIG. 1.

Flange 80 has a bottom wall 83 which is parallel to band 81 and perpendicular to axis X80. Bottom wall 83 is radially inside band 81 and offset, along axis X80, with respect to band 81. A circular wall 84 connects these two parts of flange 80 which is integral The face of flange 80 visible on FIG. 1 is the outer face of this flange, insofar as it is oriented towards the outside of bearing assembly A in the mounted configuration. The inside face of flange 80 is visible on FIG. 2. The inner radial edge of flange 80 is defined by a first skirt 85 which is cylindrical, circular and centered on axis X80. This skirt extends, along axis X80, from bottom wall 83 towards a free circular edge 852 visible from the inside face of flange 80.

A second skirt 86 is centered on axis X80 and formed by three parts 86A, 86B, and 86C. In other words, skirt 86 is not fully circular and it is interrupted by three openings 87. On FIG. 2, some phantom lines show the trace of skirt 86 if it were continuous around axis X80.

According to an alternative embodiment of the invention, skirt 86 can be circular and continuous around axis X80. In such a case, its free edge follows the phantom lines on FIG. 2.

Skirt 85 is radially inside skirt 86. In other words, skirt 85 is a radially inner skirt and skirt 86 is a radially outer skirt with respect to axis X80. Skirts 85 and 86 define, radially between them and axially with bottom wall 83, a volume V8 adapted to accommodate a part of sensor body 70. Actually, depending on the length of skirts 85 and 86 along axis X80, volume V8 can accommodate at least PCB 72 and a part of synthetic ring 74 or the totality of sensor body 70.

Figure 3:
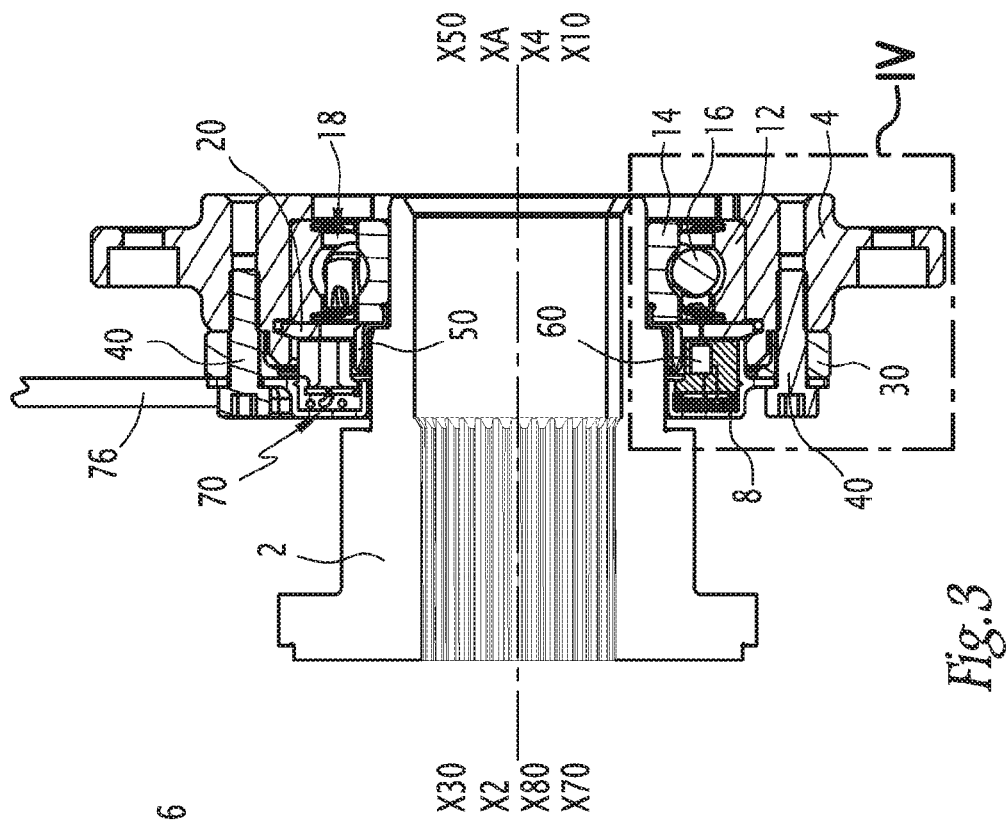
FIG. 3 is an axial cut view of the elements represented on FIG. 1.
Figure 4:
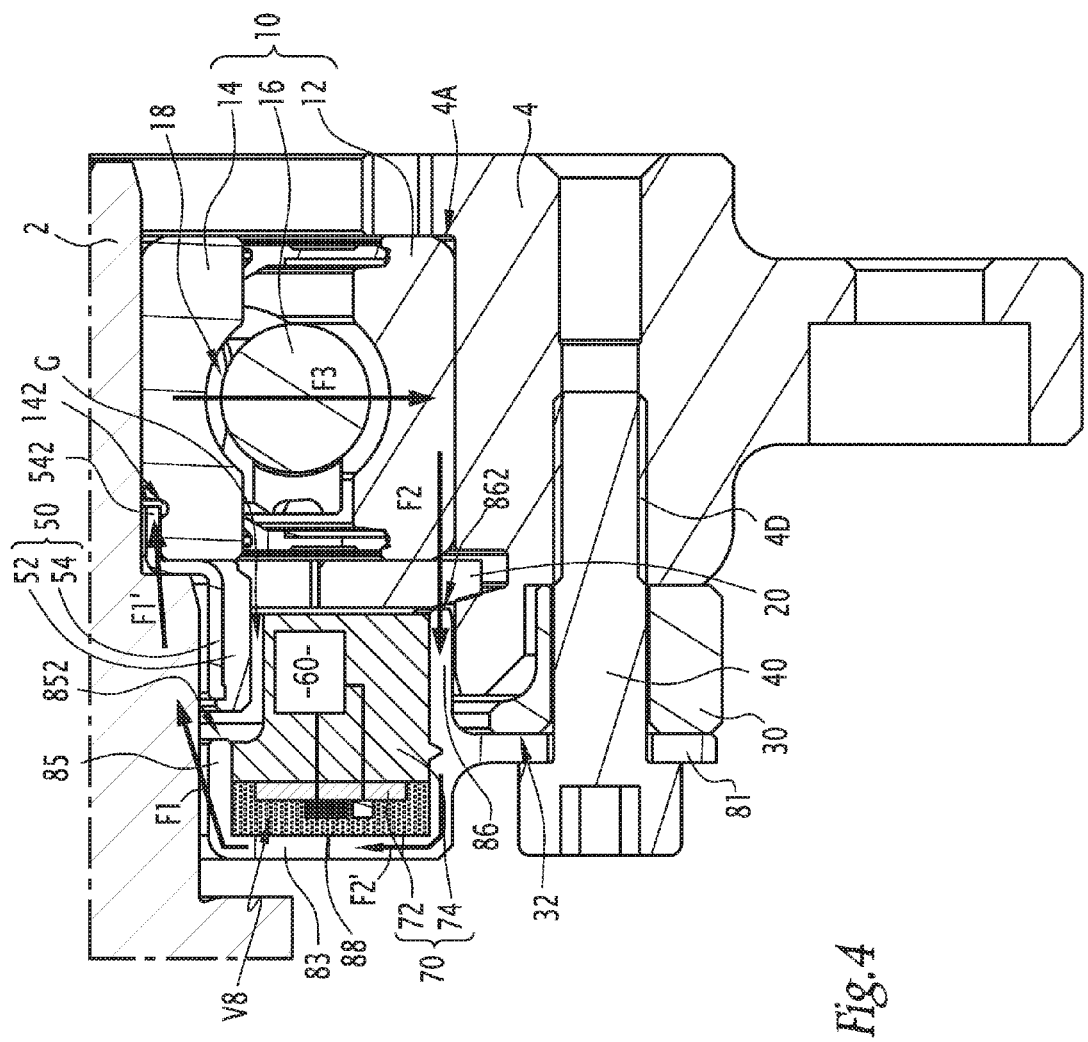
FIG. 4 is an enlarged view of detail IV on FIG. 3.

Thus, as shown on FIGS. 3 and 4, it is possible to install sensor body in volume V8 and to immobilize it with a quantity of glue 88.

In this position, sensor body 70 and sensors 60 are located radially around magnet ring 52. Each sensor 60 faces magnetic ring 52 and the air gap G between such a sensor and this magnetic ring is surrounded by ferromagnetic parts which protect it from electromagnetic perturbations coming, for instance, from the intense magnetic fields generated between the stator and the rotor of motor M.

One considers a magnetic flux around items 50 and 60 on FIG. 4, as represented by arrows F1, F1', F2, F2' and F3.

In case an external magnetic field surrounds the part of bearing assembly A represented on FIG. 4, a first preferred path for this magnetic field extends along arrow F1 on FIG. 4, that is from bottom wall 83 to inner ring 14 through first skirt 85 and shaft 2. This is possible insofar as skirt 85 extends towards inner ring 14, as its free edge 852 is oriented towards this ring. As shown by arrow F1' this first preferred path can go through armature 54 which is also ferromagnetic. This is optional and the preferred path can also go directly from shaft 2 to inner ring 14 around armature 54.

A second preferred path extends from outer ring 12 to bottom wall 83 through snap ring 20 and skirt 86, as shown by arrows F2 and F2' on FIG. 4. This is possible since skirt 86 extends towards outer ring 12 to the point that its free edge 862 is in contact or in immediate vicinity with snap ring 20.

As snap ring 20 is optional, and in case no such snap ring is used, this second preferred path can go directly from outer ring 12 to skirt 86. In such a case, a direct contact between free edge 862 and outer ring 12 can be provided, or these parts are in immediate vicinity.

A third preferred path goes from inner ring 14 to outer ring 12, through balls 16.

Thus, the three preferred paths represented respectively by arrows F1+F1', F2+F2' and F3 form together a closed path around air gap G which protects this air gap from external electromagnetic perturbations.

In other words, a sort of a screened room or Faraday cage is constituted by flange 80, shaft 2 and bearing 10 around the magnetically sensible parts 50 and 60 of bearing assembly A.

The geometry of flange 80 can be modified in order for the second preferred path to go through support member 4.

The invention is represented in the example in case one uses a ball bearing. Other types of rolling bearings, including roller bearings and needle bearings, can be considered. It is also possible to use a plain bearing. In that case, the third preferred path is formed at the interface between the two rings of their bearing.

The direction of arrows F1, F1', F2, F2' and F3 is arbitrary on FIG. 4 and the magnetic flux can also go in a direction opposite to the direction of these arrows.

Openings 87 allow a direct contact between sensor body 70 and the radial surface of housing 4A. This facilitates centering of sensor body 70 with respect to axis X4.

The invention claimed is:

1. A bearing assembly for rotatively holding a shaft with respect to a support member, said bearing assembly comprising:
    a bearing with a rotatable ring and a fixed ring to be immobilized within a housing of said support member,
    an encoder washer configured to rotate with the rotatable ring,
    at least one sensor adapted to detect at least one rotation parameter of the encoder washer,
    a sensor body for holding said sensor,
    an annular flange for mounting said sensor body with respect to said fixed ring,
    wherein
        said annular flange has a first skirt and a second skirt which define, between them and a bottom wall of said flange, an annular recess for accommodating at least a part of said sensor body,
        in mounted configuration of said bearing assembly, said first and second skirts extend axially in a direction towards said rotatable and fixed rings, respectively, such that the first skirt is radially aligned with the rotatable ring and the second skirt is radially aligned with the fixed ring, wherein the first skirt is axially spaced from the encoder washer, and
        wherein the first and second skirts directly contact first and second axially extending radial ends of the sensor body.

2. The bearing assembly according to claim 1, wherein the bearing assembly further includes mounting means for immobilizing said flange on said support member.

3. The bearing assembly according to claim 2, wherein said mounting means include screws for mounting said flange on said support member.

4. The bearing assembly according to claim 1, wherein in mounted configuration, said first skirt forms a part of a first preferred path for a magnetic flux between said bottom wall of said annular flange and said rotatable ring.

5. The bearing assembly according to claim 4, wherein said first preferred path includes a portion of said shaft.

6. The bearing assembly according to claim 4, wherein said first preferred path includes a portion of an armature of said encoder washer.

7. The bearing assembly according to claim 4, wherein, in mounted configuration, said second skirt forms a part of a second preferred path for a magnetic flux between said fixed ring and said bottom wall of said annular flange.

8. The bearing assembly according to claim 7, wherein the bearing assembly further includes mechanical means to hold said fixed ring within said housing of said support member and said second preferred path includes a portion of said mechanical means.

9. The bearing assembly according to claim 8, wherein said mechanical means include a snap ring.

10. The bearing assembly according to claim 7, wherein said second preferred path includes only said second skirt.

11. The bearing assembly according to claim 7, wherein said bearing is a rolling bearing with rolling bodies installed in a rolling chamber between said rotatable and fixed rings and, in mounted configuration, said rolling bodies form a part of a third preferred path for magnetic flux between said inner and outer rotatable and fixed rings.

12. The bearing assembly according to claim 11, wherein said first, second and third preferred paths form together a closed path.

13. A bearing assembly for rotatively holding a shaft with respect to a support member, said bearing assembly comprising:
    a plain bearing with a rotatable ring and a fixed ring to be immobilized within a housing of said support member,
    an encoder washer configured to rotate with the rotatable ring,
    at least one sensor adapted to detect at least one rotation parameter of the encoder washer,
    a sensor body for holding said sensor,
    an annular flange for mounting said sensor body with respect to said fixed ring,
    wherein
        said annular flange has a first skirt and a second skirt which define, between them and a bottom wall of said flange, an annular recess for accommodating at least a part of said sensor body,
        in mounted configuration of said bearing assembly, said first and second skirts extend respectively towards said rotatable and fixed rings, and wherein a preferred path for a magnetic flux is formed at the interface between said rotatable and fixed rings of the plain bearing.

14. The bearing assembly according to claim 13, wherein in mounted configuration, said first skirt forms a part of a second preferred path for a magnetic flux between said bottom wall of said annular flange and said rotatable ring.

15. The bearing assembly according to claim 14, wherein, in mounted configuration, said second skirt forms a part of a third preferred path for a magnetic flux between said fixed ring and said bottom wall of said annular flange.

16. The bearing assembly according to claim 15, wherein the bearing assembly further includes a snap ring to hold said fixed ring within said housing of said support member and said third preferred path includes a portion of said snap ring.

17. A bearing assembly for rotatively holding a shaft with respect to a support member, said bearing assembly comprising:
 a bearing with a rotatable ring and a fixed ring to be immobilized within a housing of said support member,
 an encoder washer configured to rotate with the rotatable ring,
 at least one sensor adapted to detect at least one rotation parameter of the encoder washer,
 a sensor body for holding said sensor,
 an annular flange for mounting said sensor body with respect to said fixed ring,
wherein
 said annular flange has a first skirt and a second skirt which define, between them and a bottom wall of said flange, an annular recess for accommodating at least a part of said sensor body,
 in mounted configuration of said bearing assembly, said first and second skirts extend respectively towards said rotatable and fixed rings, and
 wherein said second skirt has at least one opening for direct contact between said sensor body and a wall of said housing.

18. The bearing assembly according to claim 17, wherein in mounted configuration, said first skirt forms a part of a first preferred path for a magnetic flux between said bottom wall of said flange and said rotatable ring.

19. The bearing assembly according to claim 18, wherein, in mounted configuration, said second skirt forms a part of a second preferred path for a magnetic flux between said fixed ring and said bottom wall of said annular flange.

20. The bearing assembly according to claim 19, wherein the bearing assembly further includes a snap ring to hold said fixed ring within said housing of said support member and said second preferred path includes a portion of said snap ring.

* * * * *